United States Patent [19]

Kjaersgaard

[11] 3,772,614

[45] Nov. 13, 1973

[54] MODULATOR, INCLUDED IN A CARRIER FREQUENCY SYSTEM WHEREIN THE CARRIER SIGNAL PERIODICALLY INTERRUPTS THE INFORMATION SIGNAL DURING THE MODULATION PROCESS

[75] Inventor: Sven Erik Kjaersgaard, Skarholmen, Sweden

[73] Assignee: Telefonakliebolaget L. M. Ericsson, Stockholm, Sweden

[22] Filed: May 11, 1972

[21] Appl. No.: 252,282

[30] Foreign Application Priority Data

May 27, 1971 Sweden .............................. 6848/71

[52] U.S. Cl. ............... 332/16 T, 307/251, 307/304, 332/27, 332/43 B

[51] Int. Cl. ............................................... H03c 3/22

[58] Field of Search ....................... 332/16 T, 22, 27, 332/28, 31 T, 43 B, 44; 307/251, 304

[56] References Cited

UNITED STATES PATENTS

| | | | |
|---|---|---|---|
| 3,668,561 | 6/1972 | Krupa et al. | 332/31 T |
| 3,621,471 | 11/1971 | Dick | 332/28 X |
| 3,512,012 | 5/1970 | Kosowsky et al. | 332/16 T X |
| 3,444,397 | 5/1969 | Lym | 307/304 X |
| 3,371,290 | 2/1968 | Kibler | 332/44 X |

OTHER PUBLICATIONS

Haist et al. "Double–Emitter Suppressed Carrier Modulator" – Technical Disclosure Bulletin, Vol. 9, No. 12, May, 1967, p. 1794

*Primary Examiner*—Alfred L. Brody
*Attorney*—Hane, Baxley & Spiecens

[57] ABSTRACT

The present invention relates to a modulator for use in the carrier frequency techniques. The modulator includes a voltage controlled impedance element with two control electrodes, as for example a dual gate field effect transistor, in order to carry out a modulation of a carrier frequency voltage with an information signal voltage. The carrier frequency voltage is applied to one of the control electrodes of the impedance element and the information signal is applied via a resistor to the output electrodes of the element. In order to reduce the disturbing influence of the second sideband components in the frequency spectrum of the modulated signal, a voltage divider is connected across the output electrodes of the impedance element, one point on this voltage divider being connected to the second electrode of said impedance element.

10 Claims, 7 Drawing Figures

Figure 1:
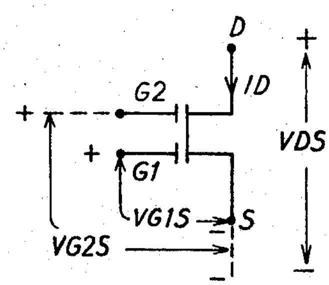

MODULATOR, INCLUDED IN A CARRIER FREQUENCY SYSTEM WHEREIN THE CARRIER SIGNAL PERIODICALLY INTERRUPTS THE INFORMATION SIGNAL DURING THE MODULATION PROCESS

The present invention relates to a modulator, preferably for carrier frequency techniques and more particularly to such a modulator in which during modulation the information signal is periodically interrupted by a carrier frequency signal. With known modulators of said type the modulation is achieved by means of a voltage controlled resistance consisting of a field effect transistor whose gate electrode receives the carrier frequency signal to whose two output electrodes, called source electrode and drain electrode, the information signal is fed.

In the modulation of above mentioned kind, a modulated signal is obtained which includes a component of the carrier frequency signal and components pertaining to the side-bands which represent the sum and the difference between the carrier frequency and the signal frequency, respectively. Moreover components pertaining to the side-bands of second and higher order are obtained. The purpose is that only the first mentioned components are to be utilized while the carrier frequency and components pertaining to the other side-bands are to be suppressed. Among the not desired components the one of the second order give the greatest contribution to the modulated signal and for that reason it is important that such components are suppressed.

An object of the present invention is thus to achieve a modulator of above mentioned kind, in which the influence of the carrier frequency and components pertaining to sidebands of the second order, which appear in the modulated signal, are reduced. Herewith, an improved linearity and a reduced carrier leak in the modulator is achieved compared with previously known modulators of similar kind (See, for example, the article "Modulateurs a transistors bipolaires et a effet de champ" in the journal Cables & Transmission No. 3, 1970 pages 262–265).

The use of field effect transistors as voltage controlled resistances is previously known, for example by the article in the journal "Electronic Components," April 1966 pages 347–350. In this article a field effect transistor of a layer type is described with a gate electrode, a source electrode and a drain electrode. The transistor is used as a symmetrical or non-symmetrical voltage controlled resistance, dependent on if both positive and negative or only positive voltage values are utilized for bringing the transistor to its conducting or non-conducting condition, by means of the incoming control voltage between the gate and the source electrode (See the FIGS. 2 and 8 in said article). For the purpose of obtaining improved linearity, a feedback coupling circuit has been connected which consist of a resistance between the drain electrode and the gate electrode of the transistor according to FIG. 4 of the article. Such a type of feedback coupling can not normally be used in a modulator in carrier frequency system, in which suppression of the harmonic components of second order is desired, due to the fact that the feedback coupling circuit voltage divides the control voltage to the gate electrode of the transistor. In a modulator of the mentioned kind this voltage will be greater than the threshold voltage of the transistor (see FIG. 2 in the article) because the transistor is to operate in its appropriate area which entails that with such a linearity circuit nearly double the threshold voltage is required. This is normally not possible for a modulator using the carrier frequency techniques. The known linearity circuit entails furthermore that a part of the impressed carrier frequency voltage leaks to the output circuit of the transistor, and for that reason a raised carrier frequency component appears in the modulated signal (so-called carrier leak).

The present invention utilizes a field effect transistor, known per se, of another type than that described in the above mentioned article wherein the transistor includes two gate electrodes insulated from each other. In such a field effect transistor each gate electrode is connected, via an insulating layer, to the semiconductor material of *n*- or *p*-type and applied side by side in the longitudinal direction of the semi-conductor channel. The insulating material can be of MOS-type or of any other type of oxide, for example, nitrite oxide.

Figure 2:
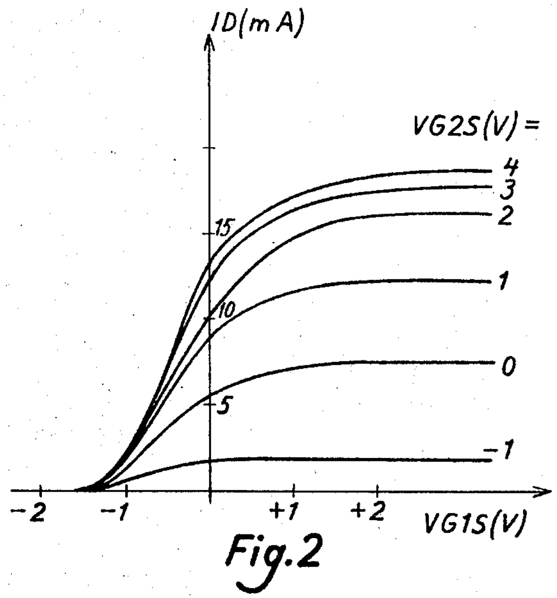
Figure 3:
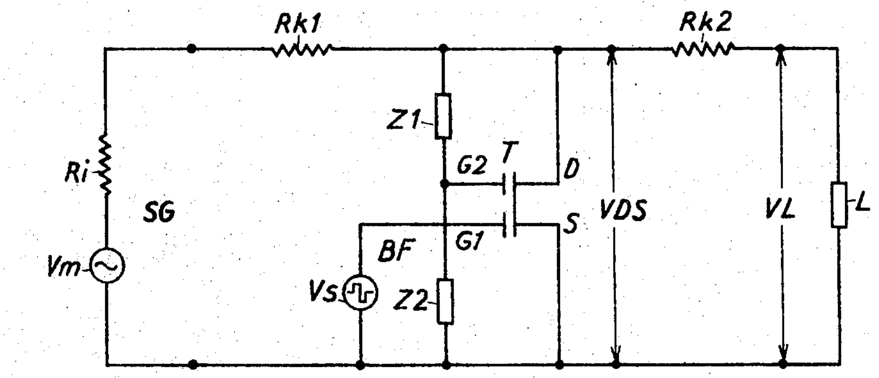
Figure 5:
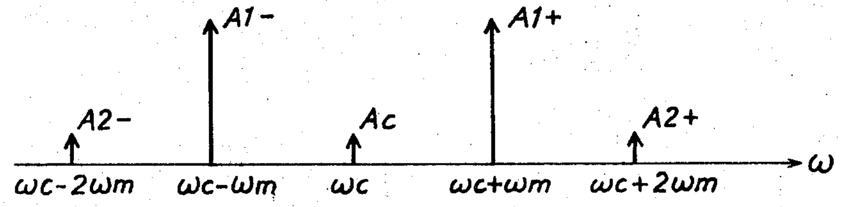
Figure 4:
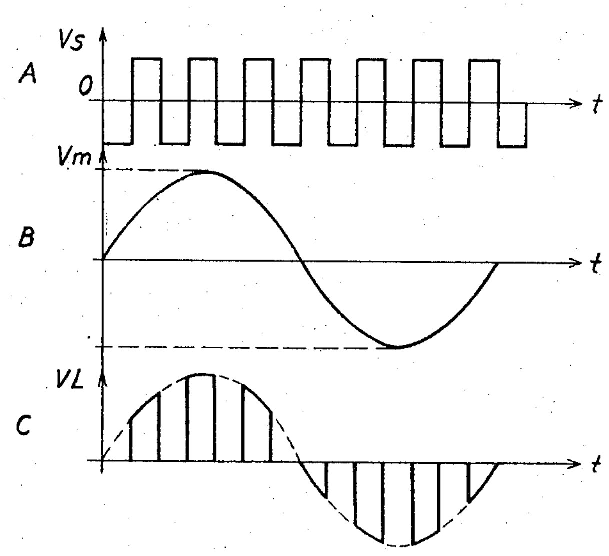
Figure 6:
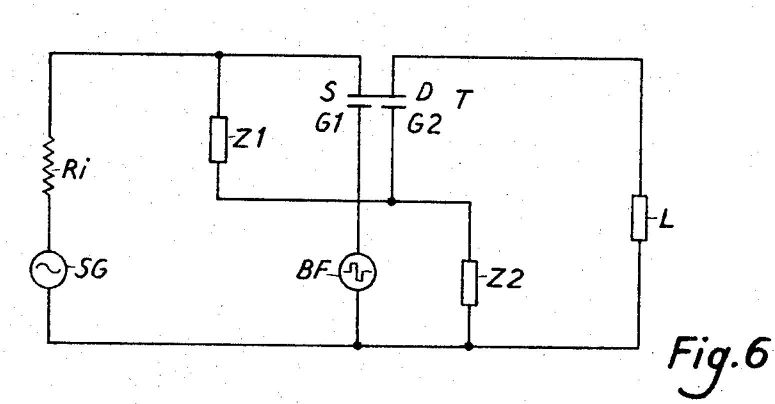
Figure 7:
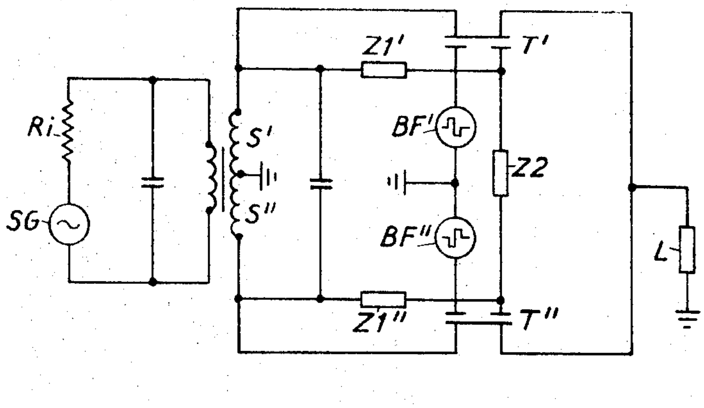

The invention, the characteristics of which appear from the following claims will be described more in detail with reference to the accompanying drawings, in which FIG. 1 shows a symbol diagram for a known field effect transistor with two gate electrodes which transistor is included in a modulator according to the invention. FIG. 2 shows a typical example for the input characteristics of the transistor according to FIG. 1. FIG. 3 shows a schematic diagram for a modulator according to the invention. FIG. 4 shows characteristic waveforms for the voltages which appear in the modulator according to FIG. 2. FIG. 5 shows a frequency diagram for clarifying the operation of the modulator. The FIGS. 6 and 7 show different embodiments of the modulator according to the invention.

The field effect transistor according to FIG. 1 has two gate electrodes G1 and G2 insulated from each other, a source electrode S and a drain electrode D. The diagram according to FIG. 2 shows a typical example of the variation of the current ID through the transistor from the drain electrode D to the source electrodes as a function of the voltage VGIS across the gate electrode G1 and the source electrode S for different values of the voltage VG2S across the other gate electrode G2 and the source electrode S. From the diagram it is apparent that the transistor can operate for both positive and negative values of the applied voltage VG1S on the first gate electrode G1. For this reason the impedance of the transistor between the electrodes D and S is low for sufficiently positive values of VG1S and high for sufficiently negative values of VG1S. The threshold value of the voltage VG1S for which the impedance of the transistor changes from being low to being high is called as known the pinch-off-voltage.

With reference to FIG. 3 the modulator according to the invention is to be described more in detail. The modulator includes a voltage controlled resistance, for example, a field effect transistor T with two insulated gate electrodes of above mentioned type. A carrier frequency generator BF is connected directly to the one gate electrode G1 at the field effect transistor T and delivers a carrier frequency voltage Vs with the frequency $\omega s$ consisting of alternately positive and negative pulses, see FIG. 4A. The amplitude of these pulses is chosen so that for each semi-period the voltage VG1S is below the pinch-off voltage for the field effect transistor T. The information signal Vm with the frequency $\omega m$, which is to modualte the carrier frequency, is delivered from a signal generator SG with an internal resistance Ri. The signal voltage in the modulator will thus alternately pass and will be blocked, respectively, by the carrier frequency voltage. The characteristic of the signal voltage appears from FIG. 4B and the characteristic of the modulated signal appears from FIG. 4C.

According to the gist of the present invention, the second gate electrode G2 of the field effect transistor is connected to a voltage divider Z1, Z2 which is connected between the drain electrode D and the source electrode S of the transistor. The impedances Z1 and Z2 consist preferably of resistances R1, R2. The ratio between the resistance values R1 and R2 determines the suppression of the second harmonic. For a certain transistor type the value of R1 and R2 can be determined when, to the output of the transistor, there is connected a variable measuring instrument, for example, a selective voltmeter, sensitive to said second harmonic, and the resistance R1, for example, being varied so that the value of the harmonic component in question decreases to a minimum. The value of the ratio between the resistances R1 and R2 is only dependent on the transistor type used and is in a practical case of 0.5 for a transistor of the type 3N140 (RCA). Practical results show that the suppression of the second harmonic component is considerably greater than that which is achieved with known modulators of the same type, for example according to the article in Cables & Transmission. It can also be mentioned that the modulator according to the invention by using a field effect transistor with dual gate electrodes gives a smaller carrier leak than previously known modulators of this type, due to the insulation between the electrode to which the carrier frequency voltage is applied (the gate electrode G1) and the output electrode (drain electrode D). In a MOS field effect transistor of such type the internal capacitance between said gate electrode and said drain electrode is only 0.01 pF, which capacitance represent the stray capacitance for the carrier leak.

A theoretical explanation to the linearity of the modulator can be given according to the following.

For a (*n*-conducting) field effect transistor in the linear range, the current ID from the drain electrode to the source electrode can be expressed as:

$ID = k\,[VG - (VG - Vds)^2]$ ; where $k$ is a physical constant (see for example Wallmark-Johnson "Field-Effect Transistors," Prentice-Hall 1966, page 117). In this connection VG denotes the difference voltage (Vgs–Vp), where Vgs is the voltage across the gate and source electrode, Vp is the pinch-off voltage of the transistor and Vds is the voltage across the drain and source electrode. Thus then is obtained:

$$ID = k\,[2VGVds - Vds^2] \qquad (1)$$

When the transistor conducts the Vds << VG, and for that reason $Vds^2$ can be neglected in comparison with 2kVGVds. Thus:

$$ID = 2kVGVds$$

The transistor can thus be considered as a linear voltage controlled resistance, in which the resistance Rds = Vds/ID becomes $$Rds = 1/2kVG = [1/2k(Vgs - Vp)]$$

From the equation (1) it is realized that the term $Vds^2$ contributes with quadratic terms of the signal wave, i.e., the harmonic components of the second order which appear on the output of the modulator.

By introduction of the linearity circuit Z1, Z2 according to the invention a contribution from the voltage Vds to VG is added. If one of the resistances, for example Z1 = R1, is chosen suitably it can be achieved that said contribution makes about half the voltage across the drain- and source electrode, i.e,, ½Vds. In this case VG = VG' + ½2Vds is obtained which inserted in the equation (1) gives:

$$ID = k\,[2(VG' + \tfrac{1}{2}Vds)Vds - Vds^2] = k2VG',$$ which gives $Rds' = VG'/ID = [1/2k(V'gs - Vp)]$ where V'gs is the voltage across the gate 1 and the source electrode of the transistor in the modulator including the linearity circuit. The quadratic term in equation (1) is thus eliminated and a pure linear voltage controlled resistance has been obtained.

The above concept has been carried out for a field effect transistor with a single gate electrode. Because in a field effect transistor with two gate electrodes, these two electrodes can be considered as a division of the single gate electrode in the first mentioned transistor the deduction according to the above analysis is also valid for a field effect transistor with two gate electrodes. In this case the voltage VG constitutes the sum of the voltages VG1 and VG2 across the source electrode and the first and the second gate electrode of the transistor, respectively.

Between the drain electrode D and the signal generator SG in FIG. 3 a resistor Rk1 is connected which serves as a short-circuit resistance for the modulator. The value of this resistance is chosen in the order half the value of the resistance Ri, due to the fact that the voltage Vm from the source SG by the modulation is pulsed by the carrier frequency voltage Vs. For this reason, on average, only half the signal effect is transmitted to the load L of the modulator.

Owing to the fact that the transistor alternately is brought to conduct or to be blocked, the signal generator is short-circuited during certain time intervals (compare FIG. 4). In this connection a modulated output voltage VL is obtained across the load L of the modulator which has the characteristic shown in FIG. 4C. As mentioned previously this voltage comprises a suppressed carrier frequency component Ac and the side-band components of the frequencies $\omega c \pm n\,\omega\,m$ and $n \cdot \omega\,c \pm \omega\,m$, where $n$ is an intergal number. The carrier frequency component and the adjacent side-band components are shown in FIG. 5. The insertion of the linearity circuit causes the side-band components A2– and A2+ with the frequencies $\omega\,c \pm 2\,\omega\,m$ to be suppressed. Other side-band components of third and higher order of the signal frequency $\omega\,m$ are of considerably less amplitude compared with the side-band components A1– and A1+ with the frequencies $\omega\,c \pm \omega\,m$, and for this reason their influence on the linearity of the modulator is neglected.

Different embodiments are possible within the scope of the invention. In FIG. 6, a modulator is shown of the same type as the above described, but in which the field effect transistor T has been connected in series with the load L to the signal source SG. The advantage with this type compared with the above described so-called shunt modulator is that the direct leak from the signal source to the load is smaller owing to the high impedance of the field effect transistor in its blocked condition. The disadvantage with this connection consists in less suppression of the modulation products in the output current of the modulator, due to the fact that the source electrode in this case is not at ground potential.

Another embodiment of the modulator according to the invention appears from FIG. 7 which shows a double balanced modulator. This includes two MOS field effect transistors T′ and T″ and carrier frequency generators BF′ and BF″ operating in opposite phase. To each of the transistors a linearity circuit is connected, each consisting of the impedances Z1′, Z1″ and Z2, the impedance Z2 being common for the two circuits. With this modulator circuit it is possible to further reduce the carrier leak.

We claim:

1. A modulator comprising a first and second input terminal for receiving a modulating voltage signal, a first and a second output terminal for transmitting a modulated carrier voltage signal, a voltage controlled impedance means having a first and a second output electrode and having a first and a second control electrode, means for connecting at least one of said output electrodes to one of said output terminals, means for connecting at least one of said input terminals to one of said output electrodes, a pulse waveform carrier frequency signal source, means for connecting said carrier frequency signal source to the first control electrode of said voltage controlled impedance means for switching the same between a conductive and non-conductive state, a voltage divider means, means for connecting said voltage divider means across the output electrodes of said controlled impedance means, and means for connecting an intermediate point of said divider means to the second control electrode of said controlled impedance means for reducing the influence of disturbing side-band components in the frequency spectrum of said modulated carrier voltage signal.

2. A modulator as claimed in claim 1 wherein said voltage controlled impedance means comprises a dual gate field effect transistor, the gate electrodes of which forming said first and second control electrodes and the source and drain electrodes of which forming said output electrodes, respectively.

3. A modulator as claimed in claim 2, wherein the field effect transistor comprises an integrated MOS-field effect transistor.

4. A modulator as claimed in claim 2, wherein said voltage divider means comprises two resistors, the common point of which being connected to said second control electrode, the ratio of the resistance values being dimensioned in dependence on the transistor type used.

5. A modulator as claimed in claim 1 further comprising a load means for receiving a modulated carrier voltage signal, means for connecting the other of said input terminals to the other of said output electrodes, means connecting one of said output terminals to one end of said load means, means including a resistor for connecting the other of said output terminals to the other end of said load means, and means for connecting the other of said output electrodes to the other of said output terminals.

6. A modulator as claimed in claim 1 wherein said means for connecting said voltage divider means includes means for connecting one end of said voltage divider means to one of said output electrodes, means for connecting the other end of said voltage divider means to the other of said output terminals, a signal load means for connecting said other output terminal to the other of said output electrodes, and further comprising means for connecting the other of said input terminals to the other of said output electrodes via said load means.

7. A modulator comprising: first and second voltage controlled impedance means, each comprising first and second output electrodes and first and second control electrodes; first and second carrier frequency signal sources operating with the same frequency but in phase opposition; first and second modulating signal sources operating with the same signals but in phase opposition; a modulated signal load; means for connecting the first output electrodes of each of said voltage controlled impedance means in parallel to said signal load; means for connecting said first and second carrier frequency signal sources to the first control electrodes of each of said voltage controlled impedance means respectively; means for connecting said first and second modulating signal sources to the second output electrodes of each of said voltage controlled impedance means, respectively; and voltage divider interconnecting means for connecting the second output electrode of one of said voltage controlled impedance means to the second output electrode of the other of said voltage controlled impedance means via connections to the second controlled electrodes of each of said impedance means.

8. A modulator as claimed in claim 7 wherein said voltage controlled impedance means comprises a dual gate field effect transistor, the gate electrodes of which forming said first and second control electrodes and the source and drain electrodes of which forming said output electrodes, respectively.

9. A modulator as claimed in claim 8, wherein the field effect transistor comprises an integrated MOS-field effect transistor.

10. A modulator as claimed in claim 7 wherein said voltage divider interconnecting means comprises a first resistor for interconnecting the second output electrode and first control electrode of said first voltage controlled impedance means, a second resistor for interconnecting the second output electrode and first control electrode of said second voltage controlled impedance means, and a third resistor interconnecting the second control electrodes of said voltage controlled impedance means.

* * * * *